United States Patent
Heineman

(10) Patent No.: US 11,899,163 B2
(45) Date of Patent: Feb. 13, 2024

(54) SYSTEM AND METHOD OF EVALUATING AND PREDICTING SPORTS CONDITIONS

(71) Applicant: Kristopher Heineman, San Clemente, CA (US)

(72) Inventor: Kristopher Heineman, San Clemente, CA (US)

(*) Notice: Subject to any disclaimer, the term of this patent is extended or adjusted under 35 U.S.C. 154(b) by 225 days.

(21) Appl. No.: 17/138,882

(22) Filed: Dec. 30, 2020

(65) Prior Publication Data

US 2021/0199851 A1     Jul. 1, 2021

Related U.S. Application Data

(60) Provisional application No. 62/954,874, filed on Dec. 30, 2019.

(51) Int. Cl.
*G06Q 50/00*     (2012.01)
*G01W 1/10*     (2006.01)

(52) U.S. Cl.
CPC .............. *G01W 1/10* (2013.01); *G06Q 50/01* (2013.01)

(58) Field of Classification Search
CPC .................................. G01W 1/10; G06Q 50/01
See application file for complete search history.

(56) References Cited

U.S. PATENT DOCUMENTS

| | | | | |
|---|---|---|---|---|
| 2012/0259842 | A1* | 10/2012 | Oman | G06Q 10/1093 707/758 |
| 2014/0280569 | A1* | 9/2014 | Harris | H04W 4/023 709/204 |
| 2015/0248651 | A1* | 9/2015 | Akutagawa | G06F 16/2465 705/7.19 |
| 2017/0262697 | A1* | 9/2017 | Kaps | G11B 27/022 |
| 2019/0019233 | A1* | 1/2019 | Bhowmick | G06F 16/24578 |
| 2019/0099653 | A1* | 4/2019 | Wanke | G06Q 50/01 |
| 2019/0385251 | A1* | 12/2019 | Werner | G06Q 10/02 |

FOREIGN PATENT DOCUMENTS

| | | | | |
|---|---|---|---|---|
| CA | 3031040 A1 * | 1/2017 | | A63B 24/0003 |
| WO | WO-2014201042 A1 * | 12/2014 | | G06Q 30/0269 |

* cited by examiner

*Primary Examiner* — Eyob Hagos
(74) *Attorney, Agent, or Firm* — InnoventLaw; Karima Gulick; Hsiang Cheng

(57) ABSTRACT

A system and method for evaluating and predicting sports conditions is disclosed. The system includes a server designed and configured to detect multi-media content including sporting activities interacted with by a user on a computing device, and automatically extracts parameters associated with the multi-media content. The extracted parameters are utilized by the system to provide predictions associated with the optimal time to perform the sporting activities, and system generates alerts to the user of an optimal time period to perform the sporting activity in conditions similar to those depicted in the multi-media content.

16 Claims, 12 Drawing Sheets

SYSTEM AND METHOD OF EVALUATING AND PREDICTING SPORTS CONDITIONS

CROSS-REFERENCE TO RELATED APPLICATIONS

This application claims priority to U.S. Provisional Patent Application Ser. No. 62/954,874 filed Dec. 30, 2019, and claims the benefit of that application, the entirety of which is hereby incorporated by reference.

FIELD OF THE DISCLOSURE

The present invention relates generally to a collection, analysis, and prediction of big data, and more specifically systems and methods for evaluating and predicting sports conditions.

BACKGROUND OF THE DISCLOSURE

In markets today, there are very limited products offered for monitoring and predicting sports conditions, particularly products that are configurable for great surfing conditions and a surfer's preferences. Current processes to predict quality surf conditions are loosely-reliable and time-consuming for interested surfers. Forecasting surf, tide, weather, and swell conditions is difficult to fully predict at nearby beaches and nearly impossible at a distant location. Most surfers access publicly available buoy information to look at deeper forecast data to predict conditions outside their nearby location.

In addition, there are no solutions in markets today that allow users to plan a trip to a faraway location based on weather and ideal sporting conditions. Every year, thousands of travelers spend a lot of time and money reaching a sporting location such as a surfing location, a scuba diving location, a sailing location or a golfing location only to realize that the weather does not permit them to exercise their chosen activity. They are then left having spent a lot of time and money organizing a sporting trip that could not come to fruition at the last minute due to weather conditions.

Currently, there are no useful alternatives that effectively assist surfers, divers, sailors, golfers and others in finding a location for which the current or predicted sporting characteristics meet preferences of the user. Therefore, there exists a need for a system and method for evaluating and predicting sports conditions that does not fall victim to the aforementioned issues associated with the current existing systems.

SUMMARY OF THE DISCLOSURE

The invention provides systems and methods for evaluating and predicting sports conditions that overcomes the herein aforementioned disadvantages of the heretofore-known devices and methods of this general type and that effectively facilitates the collection, analysis, and prediction of sporting conditions; in particular, sporting conditions associated with a geographic location based on data collected from multimedia.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system including a non-transitory memory storing an executable code. The system also includes a hardware processor executing the executable code to: receive a plurality of media inputs, where each media input may include a plurality of media metadata; receive a selection of at least one media input of the plurality of media inputs based on a plurality of parameters associated with the plurality of media inputs; determine, based on the selection, a timestamp and a geographic location associated with the selection; generate an alert associated with an optimal time period for a sporting activity based on the plurality of parameters. The system also includes a database communicatively coupled to the hardware processor. Other embodiments of this aspect include corresponding computer systems, apparatus, and computer programs recorded on one or more computer storage devices, each configured to perform the actions of the methods.

One general aspect includes a system for evaluating a sporting activity. The system includes a non-transitory memory storing an executable code and a hardware processor executing the executable code to: receive a plurality of media inputs, where each media input may include a plurality of media metadata; receive a selection of at least one media input of the plurality of media inputs based on a plurality of parameters associated with the plurality of media inputs; determine, based on the selection, a timestamp and a geographic location associated with the selection; match the plurality of parameters to an optimal time period for a sporting activity associated with the geographic location. The system also includes a database communicatively coupled to the hardware processor. Other embodiments of this aspect include corresponding computer systems, apparatus, and computer programs recorded on one or more computer storage devices, each configured to perform the actions of the methods.

One general aspect includes a method for evaluating sporting activity conditions. The method includes receiving, via a server, at least one media item, where the at least one multi-media item may include a plurality of media metadata, determining, via the server, a timestamp and a geographic location associated with the at least one media items. The method also includes analyzing, via the server, a plurality of parameters associated with the at least one multi-media item based on the timestamp and the geographic location. The method also includes storing, via the server, the plurality of parameters in a database communicatively coupled to the server, and filtering, via the server, the plurality of parameters for a plurality of relevant wave conditions based on the geographic location. Other embodiments of this aspect include corresponding computer systems, apparatus, and computer programs recorded on one or more computer storage devices, each configured to perform the actions of the methods.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

The embodiment and various embodiments can now be better understood by turning to the following detailed description of the embodiments, which are presented as illustrated examples of the embodiment defined in the claims. It is expressly understood that the embodiment as defined by the claims may be broader than the illustrated embodiments described below. Many alterations and modifications may be made by those having ordinary skill in the art without departing from the spirit and scope of the embodiments.

The present invention provides novel and efficient systems and methods for evaluating and predicting sports conditions. Embodiments of the invention provide a system configured to utilize a method to receive multimedia relating to geographic locations from various sources, extract and analyze data and metadata associated with the multimedia, and generate one or more predictions relating to the optimal time to perform sporting activities in the geographic locations based off of parameters extracted from the data and metadata. Embodiments of the invention further provide a server configured to provide a centralized platform for users to upload and/or receive images and videos of geographic locations configured to include optimal or ideal conditions for performing one or more sporting activities wherein the users select the multimedia and the server extracts a plurality of parameters from the selected multimedia in order to utilize one or more machine learning algorithms on the parameters to make predictions relating to optimal time period for users to perform one or more sporting activities in conditions matching or significantly similar to the conditions of the geographic location within the multimedia. The systems and methods provided herein provide improvements to the collection, extraction, analysis, and management of data associated with multimedia. By centralized and automated extractions of parameters from multimedia in addition to automated predictions and matching based on the parameters, the processing cost over network, computation, and storage is reduced in addition to improvements users acquire by having more accurate and efficient data relating to optimum sporting conditions.

Figure 1:
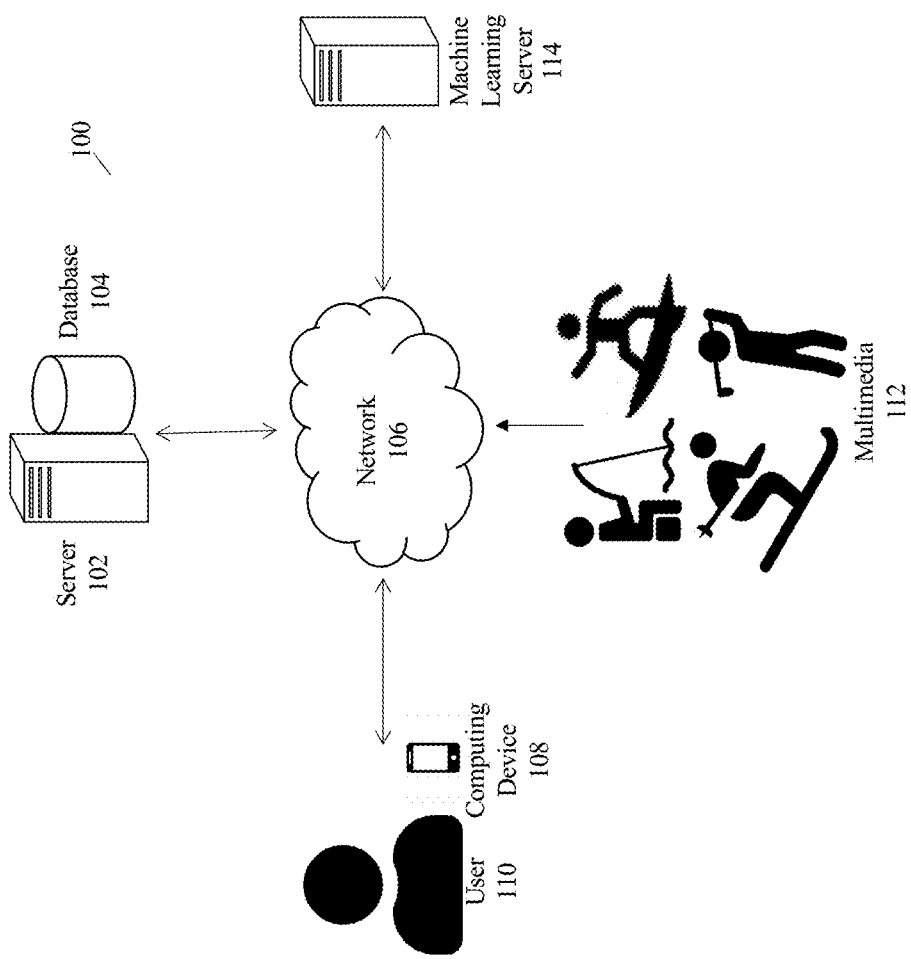
FIG. 1 is a block diagram depicting an exemplary system for evaluating and predicting sports conditions, according to an example embodiment.

Referring now to FIG. 1, a system for evaluating and predicting sports conditions 100 is depicted, according to an exemplary embodiment. In one embodiment, system 100 includes a server 102 communicatively coupled to a database 104, a computing device 108 associated with a user 110, a plurality of multi-media content 112, a machine learning server 114, wherein the aforementioned are communicatively coupled via a network 106. In one embodiment, the servers mentioned this disclosure may be a stand-alone and/or enterprise-class servers operating a server OS such as a MICROSOFT® OS, a UNIX® OS, a LINUX® OS, or other suitable server-based OS. One or more servers may be operated and/or maintained by the same or different entities. Server 102 and machine learning server 114 may be implemented in hardware, software, or a combination of hardware and software. In one embodiment, network 106 may be implemented as a Local Area Network (LAN), Wide Area Network (WAN), mobile communication network (GSM, GPRS, CDMA, MOBITEX, EDGE), Ethernet or the Internet, one or more terrestrial, satellite or wireless links, or any medium or mechanism that provides for the exchange of data between the aforementioned components of system 100. Examples of computing devices include a laptop computer, a tablet computer, a smartphone, a wearable, a desktop computer, a Personal Digital Assistant (PDA), and any other mechanism including a processor used to access the internet or on which application programs can be run. System 100 illustrates only one of many possible arrangements of components configured to perform the functionality described herein. Other arrangements may include fewer or different components, and the division of work between the components may vary depending on the arrangement. It is to be understood that system 100 may be utilized to provide an optimal time period for sporting activities including but not limited to surfing, skiing, fishing, golfing, tennis, sailing, beach volleyball, cycling, swimming, canoeing, kayaking, rafting, and any other applicable outdoor sports. In some embodiments, system 100 is configured to be utilized to provide an optimal time period for non-sporting activities such examples include but are not limited to hiking, rock-climbing, paddle-boarding, rock/climbing, skating, hunting, sledding, scuba diving, or any other applicable outdoor activity.

In one embodiment, server 102 is configured to provide a centralized platform configured to be utilized by user 110 via computing device 108 in which the centralized platform provides one or more user interfaces configured to receive inputs from user 110. In one embodiment, server 102 is configured to store collected data in a user profile specific record associated with user 110 configured to be housed in database 104. It is to be understood that in some embodiments server 102 is configured to function as a crawler communicatively coupled to computing device 108 configured to actively and continuously browse and/or "crawl" web browsers, applications, and other applicable software running on computing device 108 wherein as a result of the crawling server 102 receives extractable data associated with plurality of multi-media 112 (data received by computing device 108 from any applicable source) and associated metadata thereof. In some embodiments, server 102 performs the aforementioned crawling simultaneously to user 110 browsing web-browsers, applications, and applicable software on computing device 108. In one embodiment, server 102 may determine a predetermined multimedia interaction threshold wherein if user 110 engages with a subset of plurality of multi-media 112 exceeding the predetermined multimedia interaction threshold then server 102 automatically selects the applicable multi-media and extracts parameters associated with the multi-media content. It is to be understood that some of the aforementioned parameters may not be extractable from multi-media and/or multi-media metadata; thus, in some embodiments, server 102 may access one or more third party sources (environmental and/or social sources) for some of the parameters if not extractable from the multi-media user 110 is interacting with. For example, in some embodiments, server 102 detects user 110 exceeded the predetermined multimedia interaction threshold via user 110 liking or commenting on a picture or video on a social media platform (Facebook, Twitter, Instagram, etc.) in which server 102 determines the geographic location and the timestamp associated with the image or video and subsequently accesses one or more third party sources, such as the National Data Buoy Center for meteorological and oceanographic measurements, weather source, or any other applicable entity configured to provide specific environmental, social, historical, and/or forecast data in order to compile a history of the applicable parameters for the acquired geographic location associated with the multi-media interacted with and/or selected by user 110. It is to be understood that user profile specific records serve as a mechanism for data associated with user 110 while operating on system 100 including but not limited to multi-media selected and/or interacted with by user 110, relevant data associated with the plurality of parameters based on the geographic location and/or timestamp, or any other applicable data associated with user 110 configured to assist predictions of optimal times for sporting activities to be housed and readily accessed.

As described herein, multi-media may be any image, video, audio, animation, art, or combination thereof configured to be transmitted, uploaded, or curated on any applicable web content platform/social networking service, such as but not limited to Facebook, Instagram, Twitter, Reddit, Tumblr, Snapchat, Flickr, Pintrest, Tik Tok, or any other applicable mechanism configured to continuously present digital content to users. It is to be understood that server 102 is designed and configured to detect one or more interactions between user 110 and at least one multi-media content of plurality of multi-media 112. For example, if user 110 performs an interaction with a particular multi-media such as a like, favorite, repost, share, comment, screenshot, or any other applicable action indicating interest in the particular multi-media, server 102 automatically extracts data and metadata of the particular multi-media in order to determine a geographic location associated with the particular multi-media and a timestamp associated with the particular multi-media. In one embodiment, extraction of data and metadata of plurality of multi-media 112 along with features associated with the aforementioned is performed by machine learning server 114, wherein machine learning server 114 utilizes one or more machine learning algorithms to perform feature selection, development of feature vectors, dimensionality reduction, any other applicable machine learning tasks. It is the objective of server 102 and/or machine learning server 114, alone or in combination, to continuously extract and analyze data and metadata associated with plurality of multi-media 112 that is of interest of user 110, however; in some embodiments, server 102 initially determines the geographic location and timestamp associated with the particular multi-media and determines the applicable parameters of the plurality of parameters based on the geographic location and timestamp.

In one embodiment, machine learning server 114 may apply one or more machine learning algorithms to data collected by system 100 in order to generate predictions based on the collected data. Machine learning server 114 utilizes a machine learning model or a rule-based model in order to generate predictions associated with an optimal time for one or more sporting activities to be performed at a geographic location. For example, if the model is a machine-learned model, then one or more machine learning techniques are used to "learn" weights of different features, which weights are then utilized by server 102 to generate one or more predictions associated with an optimal time for one or more sporting activities to be performed at a geographic location. The features, also known as feature values, associated with the weights include a plurality of parameters that include but are not limited to a geographic location, a timestamp, a percent match, tide, a temperature, a wave height, a wave direction, a wave period, a sea level, a swell height, a swell direction, a swell period, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, a UV ray filtration, a visibility, snow depth, base depth, snow freshness, salinity, or any other applicable sporting activities factors.

Figure 2A:
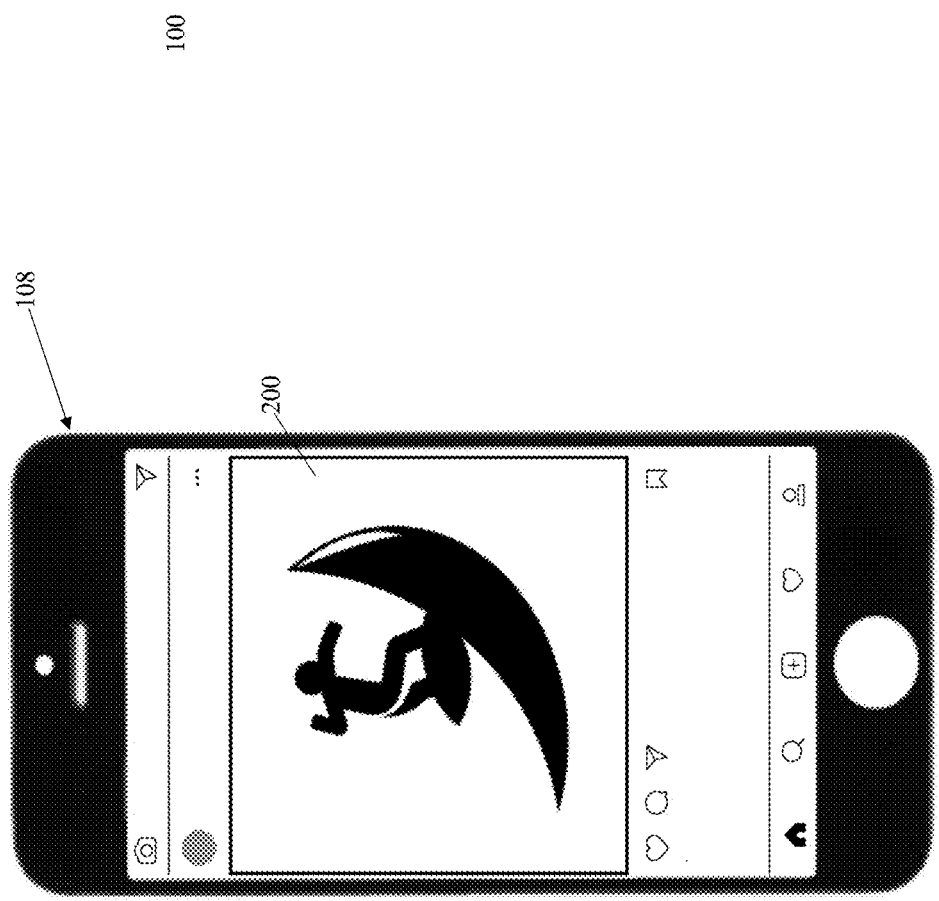
FIG. 2A is a user interface of a social media platform including data configured to be collected by the system for evaluating and predicting sports conditions, according to an example embodiment.
Figure 2B:
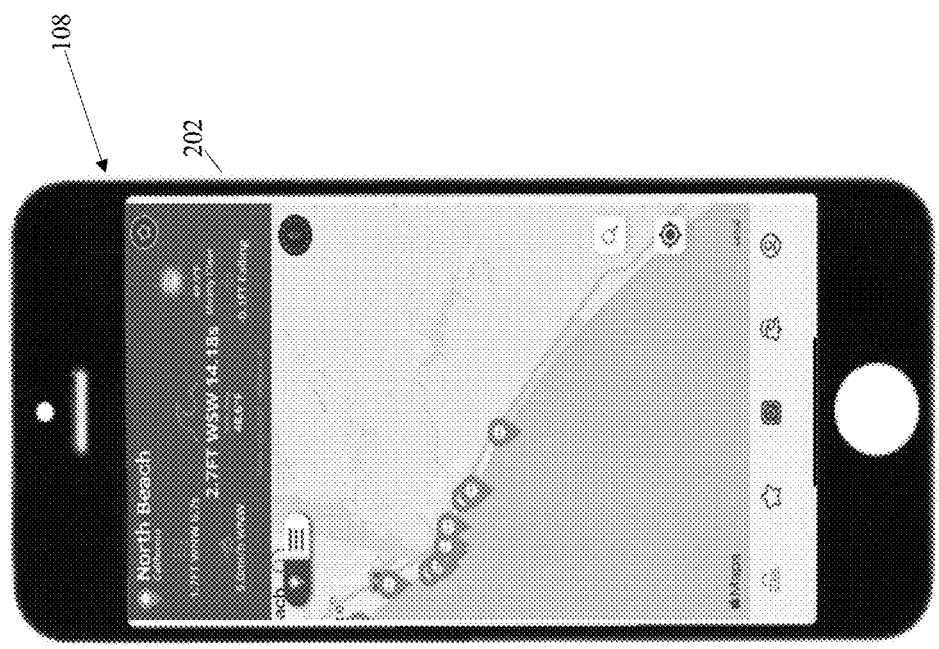
FIG. 2B is a user interface provided to a user of the system for evaluating and predicting sports conditions, according to an example embodiment.
Figure 2C:
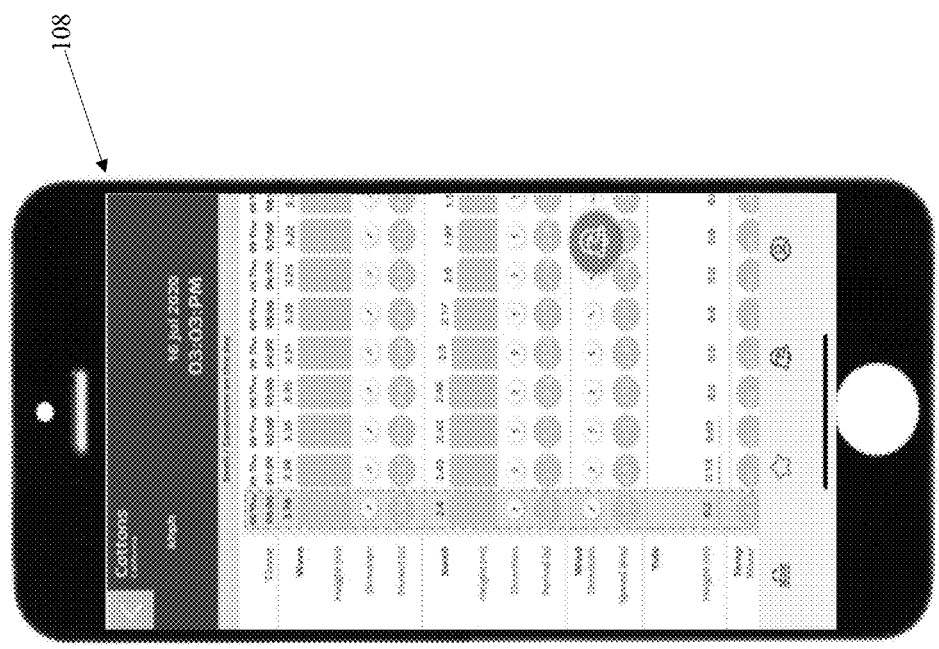
FIG. 2C is a user interface provided to a user of the system for evaluating and predicting sports conditions, according to an example embodiment.
Figure 2D:
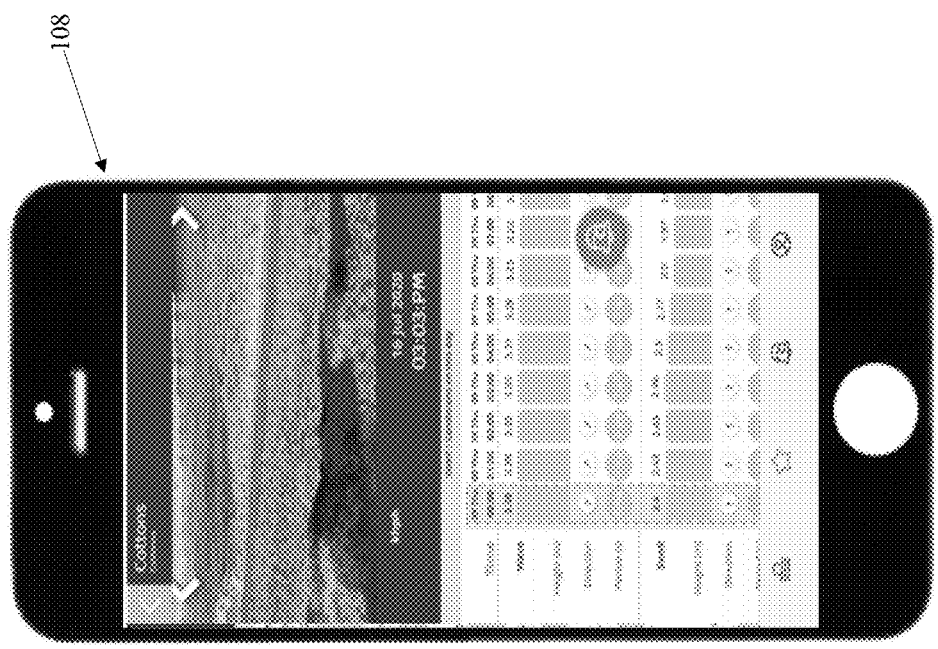
FIG. 2D is a user interface provided to a user of the system for evaluating and predicting sports conditions, according to an example embodiment.
Figure 2E:
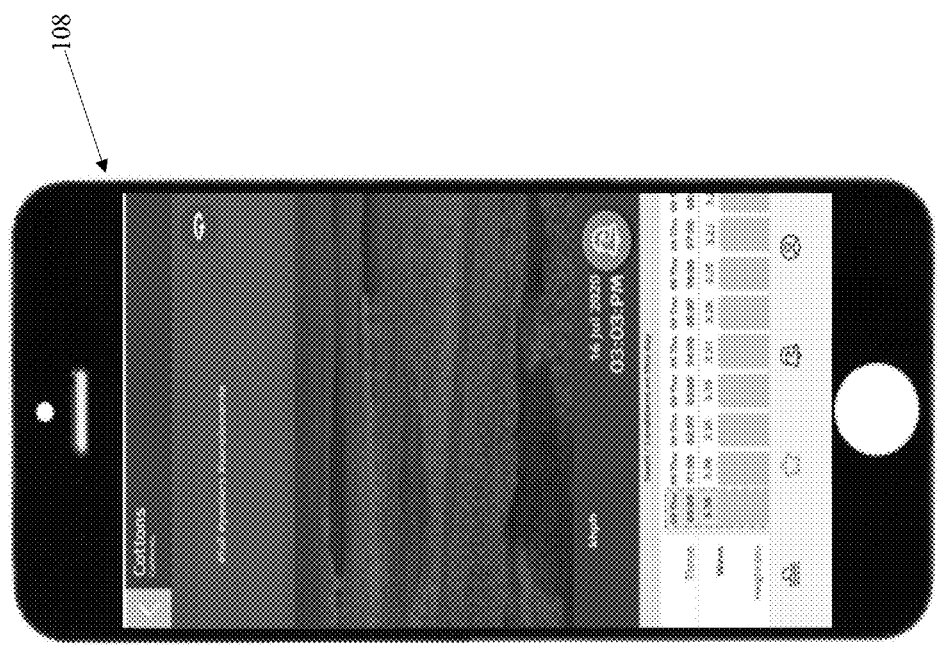
FIG. 2E is a user interface provided to a user of the system for evaluating and predicting sports conditions, according to an example embodiment.
Figure 2F:
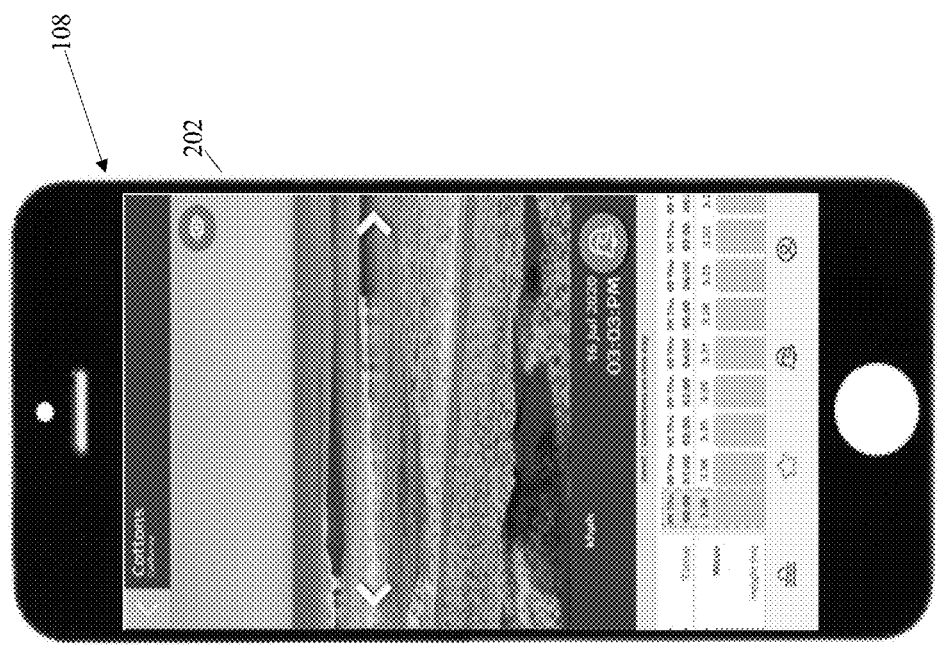
FIG. 2F is a user interface provided to a user of the system for evaluating and predicting sports conditions, according to an example embodiment.
Figure 2G:
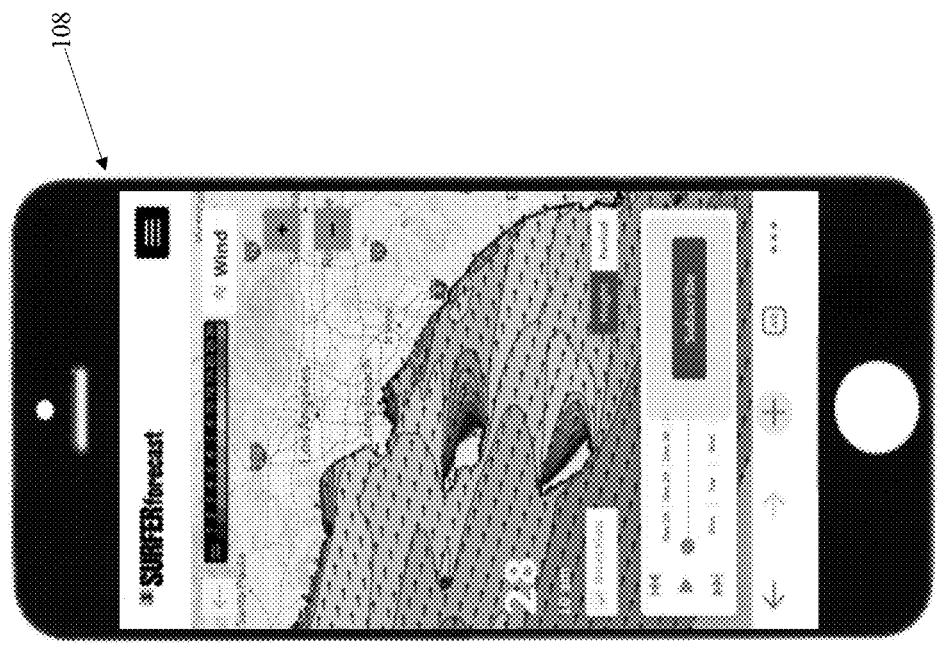
FIG. 2G is a user interface provided to a user of the system for evaluating and predicting sports conditions, according to an example embodiment.

Referring now to FIGS. 2A-2B, examples of user interfaces 200 & 202 are presented on computing device 108, according to an exemplary embodiment. In a working example, user 110 is utilizing a social media platform on computing device 108 in which user 110 is continuously being fed plurality of multi-media 112 from applicable sources (social media platforms, multimedia messaging services, etc.), wherein user 110 likes a particular multi-media depicting an individual surfing as illustrated in FIG. 2A based upon the particular multi-media illustrating ideal conditions for surfing. In one embodiment, ideal conditions are determined by server 102 based on the one or more interactions with the particular media and/or one or more preferences indicated by user 110 wherein the one or more preferences are stored in the user profile specific record associated with user 108 and are configured to be used as parameters for server 102 and/or machine learning server 114 to predict an optimal time period for a sporting activity. Upon user 110 liking the particular multi-media, server 102 automatically determines a geographic location and a timestamp of the particular media, wherein in this working example the geographic location of the particular multi-media is determined to be North Beach, California and the timestamp is configured to be a particular period of time optimal for surfing, wherein server 102 automatically accesses meteorological and oceanographic measurements and other applicable sources in order to acquire the plurality of parameters associated with North Beach, California allowing server 102 and/or machine learning server 114 to perform the one or more machine learning algorithms to predict the optimal time for user 110 to go surfing in North Beach, California. It is to be understood that the aforementioned centralized platform provided by server 102 is configured to provide user 110 with an interactive map including the geographic location associated with the particular multi-media (multi-media selected by user 110) of plurality of multi-media 112 as illustrated in FIG. 2B in order to portray the current conditions associated with the geographic location of the particular multi-media in addition to an optimal time period for a sporting activity based on the plurality of parameters derived from a combination of the one or more preferences specific to user 110 and the plurality of parameters extractable from the particular multi-media. For example, user interface 202 is configured to depict the weather temperature, temperature of the water, wind speed, wind direction, and any other applicable conditions useful for a surfer. It is to be understood that user interfaces provided to computing device 108 by the centralized platform operated by server 102 are configured to support toggle buttons, interactive maps, slider tags, icons, message boxes, modal windows, and any other applicable user interface components known to those of ordinary skill in the art configured to assist user 110 with utilizing system 100. In addition, these user interfaces are configured to provider user 110 with real-time alerts of optimal sporting conditions based on selected multi-media along with relevant parameters associated with similar destinations to those relating to the geographic location and/or timestamp acquired by server 102.

Figure 3:
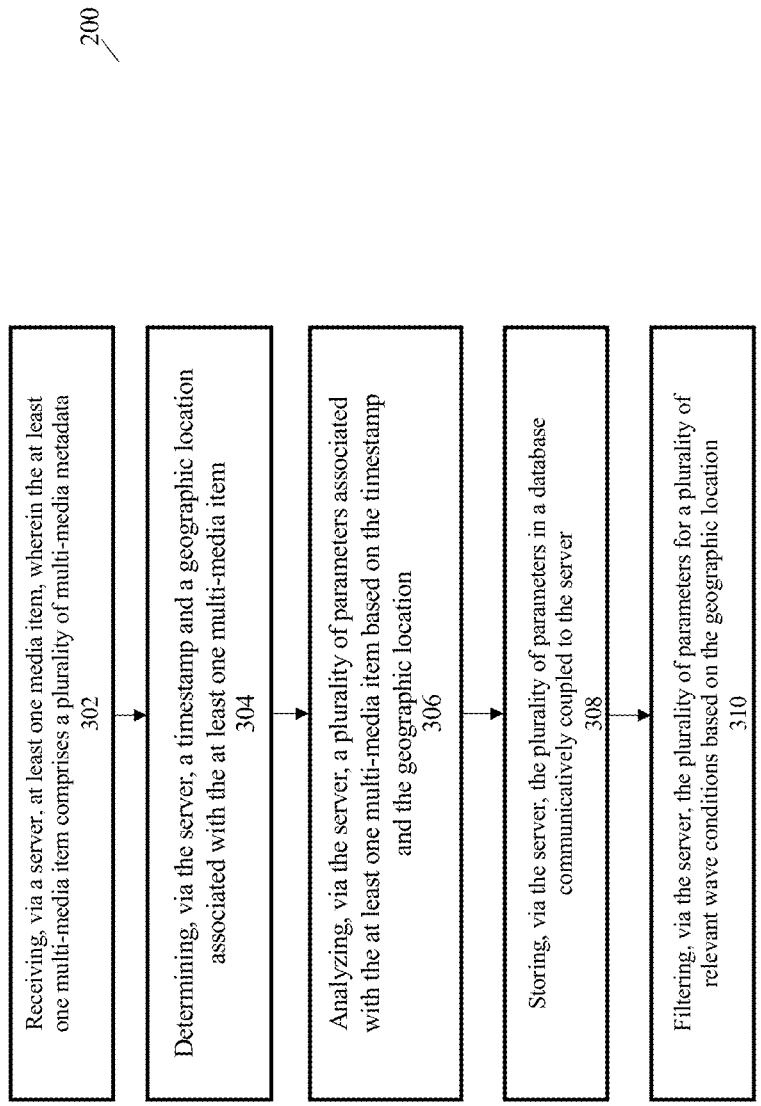
FIG. 3 is a block diagram illustrating an exemplary method for evaluating and predicting sports conditions, according to an example embodiment.
Figure 4:
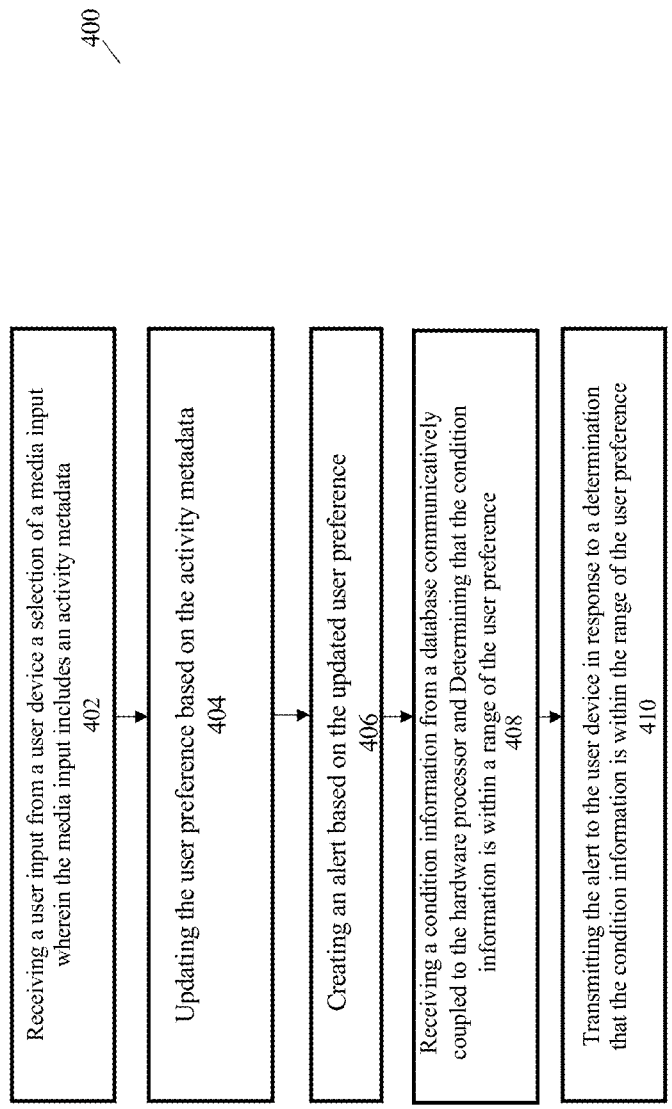
FIG. 4 is a block diagram illustrating another exemplary method for evaluating and predicting sports conditions, according to an example embodiment.
Figure 5:
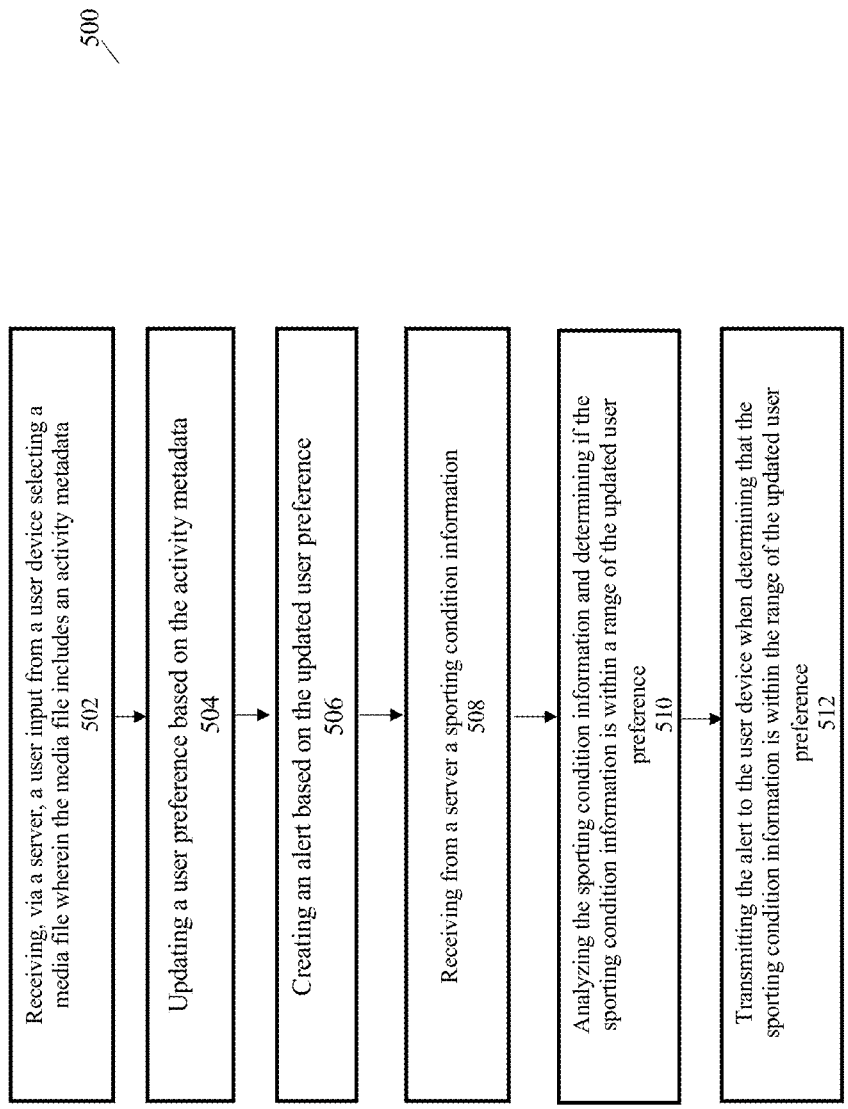
FIG. 5 is a block diagram illustrating yet another exemplary method for evaluating and predicting sports conditions, according to an example embodiment.

Referring now to FIG. 3, a method for evaluating and predicting sports conditions 300 is depicted, according to an exemplary embodiment. At step 302, computing device 108 receives plurality of multi-media 112 from the applicable source, such as a social network platform operating on computing device 108, a multi-media text message received by computing device 108, or any other applicable mechanism for a computing device to receive multi-media in which server 102 actively crawls and monitors interactions between user 110 and plurality of multi-media 112. In one embodiment, server 102 is configured to receive an audio input associated with a sporting activity including at least one parameter from user 110 via computing device 108. For example, computing device 108 may receive an audio input from user 110 while user 110 is viewing a particular multi-media on computing device 108 in which user 110 expresses "This looks like the perfect weather for surfing!" in which server 102 automatically selects the particular multi-media, extracts the data and metadata from the multi-media, and stores the applicable plurality of parameters (along with relevant data from other sources associated with the particular multi-media) in the user profile specific record associated with user 110 housed in database 104. It is to be understood that although system 100 is configured to be utilized by individuals seeking optimal times to perform sporting activities, system 100 is configured to be utilized in other various environments including but not limited to meteorology, oceanography, geology, seismology, zoology, naval, coast guard, law enforcement, and any other applicable environment configured to utilize real-time analytics and micro-analytics associated with an optimal time to perform a specific function. At step 304, sever 102 analyzes the particular multi-media selected by user 110 and determines a timestamp and a geographic location associated with the particular multi-media. In one embodiment, server 102 automatically extracts the plurality of parameters from the particular multi-media wherein the plurality of parameters includes at least the timestamp and the geographic location associated with the particular multi-media and the aforementioned data is configured to be stored in the user profile specific record allowing server 102 and/or machine learning server 114 to generate predictions based on the plurality of parameters associated with user 110 in addition to other applicable parameters associated with the sporting activity. For example, if the particular multi-media portrays an individual playing golf in optimal conditions then at least the geographic location and the timestamp associated with the particular multi-media are extracted in addition to data (outside temperature, wind speed, wind direction, etc.) sourced from a weather entity relating to the geographic location. At step 306, server 102 analyzes the plurality of parameters associated with the particular multi-media including collecting data from applicable sources based on the geographic location and timestamp relating to the particular multi-media. At step 308, the geographic location, timestamp, and the outside sourced data relating to the geographic location and timestamp are collected by server 102 and stored in user profile specific record allowing machine learning server 114 to have access to the aforementioned data to perform one or more machine learning algorithms pertaining to said data. At step 310, server 102 filters the plurality of parameters in order to assist machine learning server 114 in performing the most relevant and accurate predictions of the optimal time to perform the sporting activity under the same or significantly similar conditions depicted in the particular multi-media. For example, based on the selected multi-media and the plurality of parameters stored in the user profile specific record (if applicable) server 102 is configured to filter the aforementioned data to obtain a plurality of wave conditions (tide, a temperature, a wave height, a wave direction, a wave period, a sea level, a swell height, a swell direction, etc.) that match those presented or ascertainable from the selected multi-media. In some embodiments, server 102 generates an alert sent to computing device 108 that there is a match or significant match to the plurality of parameters and conditions depicted within the selected multi-media indicating the optimal time for user 110 to perform the applicable sporting activity. In some embodiments, server 102 is configured to alert user 110 of other applicable geographic locations that present similar or significantly matching conditions (parameters) to those extractable and ascertainable from the selected multi-media. For example, if the geographic location in the selected multi-media is North Beach, California, server 102 may provide user 110 with other relevant surfing destinations that are currently exhibiting matching parameters to the conditions of the selected multi-media.

Figure 6:
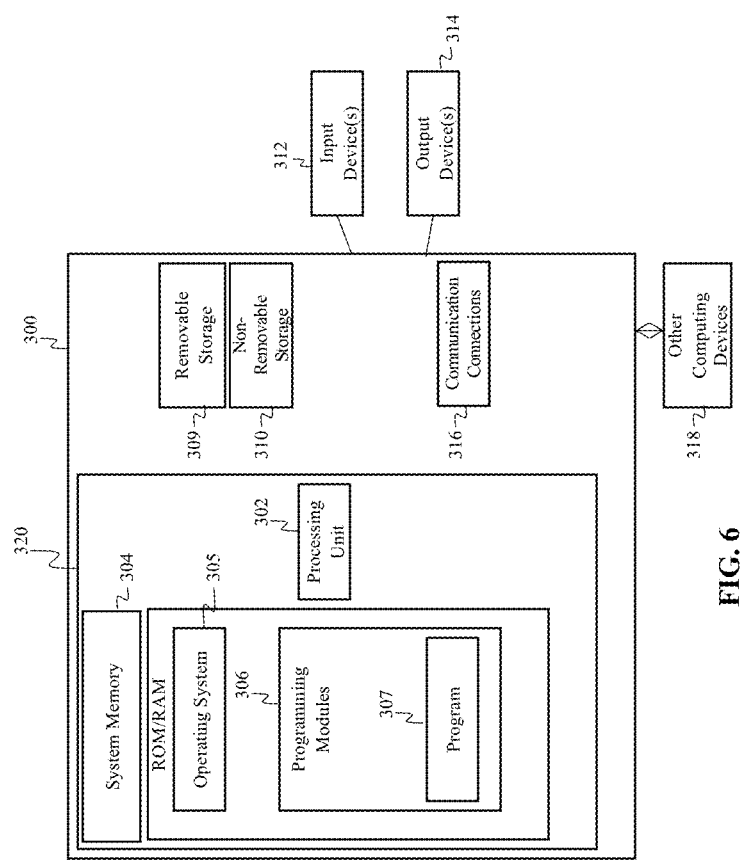
FIG. 6 illustrates a computer system according to exemplary embodiments of the present technology.

FIG. 6 is a block diagram of a system including an example computing device 400 and other computing devices. Consistent with the embodiments described herein, the aforementioned actions performed by server 102, computing device 108, and machine learning server 114 may be implemented in a computing device, such as the computing device 400 of FIG. 6. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for system 100 and process/method 300. Process 300, and data related to said processes may operate in other environments and are not limited to computing device 400.

With reference to FIG. 6, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, and one or more programming modules 406. Operating system 405, for example, may be suitable for controlling computing device 400's operation. In one embodiment, programming modules 406 may include, for example, a program module 407 for executing the actions of server 102, computing device 108, and machine learning server 114, for example. Furthermore, embodiments of the invention may be practiced in conjunction with a graphics library, other operating systems, or any other application program and is not limited to any particular application or system. This basic configuration is illustrated in FIG. 6 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 6 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 404, including operating system 405. While executing on processing unit 402, programming modules 406 (e.g. program module 407) may perform processes including, for example, one or more of the stages of the process 300 as described above. The aforementioned processes are examples, and processing unit 402 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

In one embodiment of the present disclosure, the system can be summarized as an application where a user can select a media input such as a photo, or a video from the internet or media library (social media or other) and have the system analyze the metadata of that photo and/or video including its timestamp (date and time the image or video were recorded) and a geotag or geolocation of that image or video. The system then retrieves relevant data based on that particular media's time, date and location such as meteorological data, oceanographical data or other similar data from historical weather forecasting databases. The system then receives future weather forecasting data from third parties and an alert is displayed per a user selection when the data from the selected and input media and the future weather forecasting data are a match.

The present disclosure can be embodied as a system 100 comprising a non-transitory memory configured to store a user preference and an executable code, and a hardware processor configured to execute the executable code. The executable code is to receive a user input from a user device 108 selecting a media input 112 where the media input includes an activity metadata. The executable code then updates the user preference based on the activity metadata and creates an alert based on the updated user preference. The executable code then receives a condition information from a database communicatively coupled to the hardware processor and determines that the condition information is within a range of the user preference. When the condition information is within the range of the user preference, the executable code transmits the alert to the user device in response to a determination that the condition information is within the range of the user preference.

In another embodiment, the activity metadata comprises: a percent match, a tide, a temperature, a wave height, a wave direction, a wave period, a sea level, a swell height, a swell direction, a swell period, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, a UV ray filtration, a current information, an underwater visibility and/or a visibility. Here, the percent match allows a user to determine a percentage at which the user wants the alert to be transmitted.

In some use cases and some embodiments, the user wants to be notified when her desired parameters are within 80% of the forecast, whereas in other user cases, the user might want a higher match or a lower match. Here, the percent match allows the user flexibility in when to receive an alert. In some instances, it can be almost impossible to reproduce exact sporting activity conditions to a 100% degree, while in other use cases, a user might want to set an alert in one geographical location based on an alert set from a different part of the world.

In another embodiment, the media input can be an image, a video, an audio file, a video and audio file, a media stream, a live media stream, a live audio feed, a live video feed, a live audio and video feed, a media file, a text, an emoji, and/or a hashtag.

In yet another embodiment, the media input is sourced from a social networking platform, a third-party network, a media feed and/or configured to be stored in the user preference. In some embodiments, the activity metadata includes a timestamp and/or a geographic location. In other embodiments, the condition information includes a meteorological measurement and/or an oceanographic measurement retrieved from a third-party source. Here, the measurements can be retrieved actively or passively by the system.

In an alternative embodiment, the hardware processor is also configured to retrieve the condition information including a plurality of historical meteorological data associated with a geographical location of the media input based on a timestamp of the media input and a geolocation of the media input from a third party source; compile and store the plurality of historical meteorological data in the database based on the timestamp and the geographical location of the media input; update the user preference based on the condition information; and update the alert based on the updated user preference. In one particular embodiment, the alert is transmitted based on matching the condition information retrieved from the plurality of historical meteorological data with a retrieved upcoming forecast data.

The present disclosure can also be embodied in a system for evaluating and forecasting a sporting condition which includes a non-transitory memory configured to store an executable code; and a hardware processor configured to execute the executable code. Here the executable code receives at least one of a media inputs and a desired parameter from a user device, where the media input includes a media metadata. The system then determines, based on the media metadata a timestamp and a geographical location associated with the media input, retrieves a meteorological data for the media input based on the timestamp and the geographical location of the media input from a third-party source, creates an alert based on the meteorological data of the media input, receives a forecast condition information from a database communicatively coupled to the hardware processor and determine that the forecast condition information is within a range of the alert, and transmits the alert in response to a determination that the forecast condition information is within the range of the alert.

In another embodiment, the meteorological data and the desired parameter each include at a temperature, a percent match, a tide, a temperature, a wave height, a wave direction, a wave period, a sea level, a swell height, a swell direction, a swell period, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, a UV ray filtration, a current information, an underwater visibility, a visibility, a level of snow, a level of fresh snow, a base depth, a snow depth, and/or a packed powder data. In other embodiment, the data is specific and can be tailored to the appropriate sporting activity for which the user is trying to predict the appropriate sporting conditions.

In one particular embodiment, the hardware processor of the system 100 is further configured to generate an alert associated with an optimal time period for a sporting activity based on the desired parameter. In other embodiments, the alert is generated based on matching the desired parameter to a set of user preferred conditions associated with the sporting activity stored in the database.

In one aspect, the present disclosure is embodied as a method for evaluating sporting activity conditions by a non-transitory memory connected to a hardware processor. The method includes the steps of receiving, via a server, a user input from a user device selecting a media file wherein the media file includes an activity metadata; updating a user preference based on the activity metadata; creating an alert based on the updated user preference; receiving from a server a sporting condition information; analyzing the sporting condition information and determining if the sporting condition information is within a range of the updated user preference; and transmitting the alert to the user device when determining that the sporting condition information is within the range of the updated user preference.

In one embodiment, the method also includes the steps of determining, via the server, a timestamp and a geographic location associated with the media file; analyzing, via the server, a plurality of parameters associated with the media file based on the timestamp and the geographic location; storing, via the server, the plurality of parameters in a database communicatively coupled to the server; and filtering, via the server, the plurality of parameters for a plurality of relevant sporting conditions based on the geographic location.

In another embodiment, the method includes the steps of predicting, via the server, a plurality of relevant sporting conditions; and generating the alert for an optimal condition associated with a sporting activity based on the plurality of relevant sporting conditions.

In another embodiment, the method where predicting the plurality of relevant sporting conditions includes the steps of identifying a first plurality of feature values associated with a geographic location; determining whether the plurality of relevant sporting conditions match a set of user-preferences stored in a database; storing training data that comprises a plurality of training instances, wherein each training instance in the plurality of training instances corresponds to the plurality of relevant wave conditions, and the training data includes the plurality of feature values; and utilizing one or more machine learning techniques to train a classification model based on the training data; where the determination comprises inserting the plurality of feature values into the classification model that generates an output that is used to determine a time period for optimal sporting conditions.

In another embodiment, the method also includes analyzing the plurality of relevant sporting conditions comprises receiving a selection of the media file and the user input. In one particular embodiment the user input is sourced from a social networking platform and configured to be stored in a database.

In another embodiment, the sporting condition information includes a percent match, tide, a temperature, a wave height, a wave direction, a wave period, a sea level, a swell height, a swell direction, a swell period, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, a UV ray filtration, and/or a visibility.

In yet another embodiment, the system method also includes the steps of receiving a media input and a desired parameter from a user device, where the media input includes a media metadata. The system then determines based on the media metadata a timestamp and a geographical location associated with the media input, retrieves a meteorological data for the media input based on the timestamp and the geographical location of the media input from a third-party source. The system then creates an alert based on the meteorological data of the media input, retrieves a forecast condition information from a database communicatively coupled to the hardware processor and determining that the forecast condition information is within a range of the alert; and transmits the alert in response to a determination that the forecast condition information is within the range of the alert.

In one particular embodiment, a user can take a photo or video of sporting conditions in real time, and use that photo of video as an input for the system to create an alert and let the user know when sporting conditions will match the real time conditions in a future determined time, a future time set by the user, and/or at a location of a user's choice. In one specific embodiment, the user's preference gets updated based on the real time addition made by the user.

In some embodiments, the user can set when they want the alert to be generated, within a given time frame and within a radius of the location of a user's choice. For example, a user can plan for an upcoming trip to a given location for vacation and set an alert a few days in advance for when their location of choice will have sporting conditions matching the user's preferences.

In one particular embodiment, the system can operate on a rating system where a user's preference is aggregated and stored under a user's profile. Here the user can give a thumbs up or down, or rate on a scale various media inputs such as images from a preloaded library. The system then aggregates the user's selection and creates a user preference that mimics (averages or creates a range based on the media's metadata) and alerts a user when their preferred conditions are met.

In one embodiment, the alert can be set while taking into consideration the time it will take the user to reach the location with their preferred conditions.

The claims appended hereto are meant to cover all modifications and changes within the scope and spirit of the present invention.

What is claimed is:

1. A system for evaluating and forecasting a surfing condition comprising:
a non-transitory memory configured to store an executable code; and
a hardware processor configured to execute the executable code to:
identify a selection of a user of the media input related to a surfing activity using software running on the user device;
identify an interaction of the user with the media input that indicates an interest in the surfing activity presented in the media input;
receive at least one of the media input and a desired parameter associated with the surfing activity from the user device, wherein the media input includes a media metadata;
determine, based on the media metadata a timestamp and a geographical location associated with the media input;
retrieve a meteorological data associated with the media input based on the timestamp and the geographical location of the media input from a third-party surfing meteorological database;
create an alert related to the surfing activity and based on at least one of the meteorological data of the media input and the desired parameter;
receive a forecast condition information from a database communicatively coupled to the hardware processor and determine that the forecast condition information is within a range of the alert; and
transmit the alert in response to a determination that the forecast condition information is within the range of the alert.

2. The system of claim 1, wherein the meteorological data and the desired parameter each include at least one of a temperature, a percent match, a tide, a a wave height, a wave direction, a wave period, a sea level, a swell height, a swell direction, a swell period, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, a ultraviolet ray filtration, a current information, an underwater visibility, a visibility, a level of snow, a level of fresh snow, a base depth, a snow depth, and a packed powder data.

3. The system of claim 1, wherein the hardware processor is further configured to generate an alert associated with an optimal time period for a surfing activity based on the desired parameter.

4. The system of claim 3, wherein the alert is generated based on matching the desired parameter to a set of user preferred conditions associated with the surfing activity stored in the database.

5. A method for evaluating surfing activity conditions by a non-transitory memory connected to a hardware processor, comprising:
receiving, via a server, a user input from a user device selecting a media input wherein the media input includes media metadata;
identifying a selection of a user of the media input related to the surfing activity using software running on the user device;
identifying an interaction of the user with the media input that indicates an interest in the surfing activity presented in the media input;
updating a user preference based on the interaction, the surfing activity, and the media metadata;
determining, based on the media metadata a timestamp and a geographical location associated with the media input;
retrieving a meteorological data associated with the media input based on the timestamp and the geographical location of the media input from a third-party source;
creating an alert related to the surfing activity and based on the updated user preference and the meteorological data of the media input;
receiving from a server a surfing condition information related to the surfing activity;
analyzing the surfing condition information and determining if the surfing condition information is within a range of the updated user preference; and
transmitting the alert to the user device when determining that the surfing condition information is within the range of the updated user preference.

6. The method of claim 5 further comprising the steps of:
determining, via the server, a timestamp and a geographic location associated with the media input;
analyzing, via the server, a plurality of parameters associated with the media input based on the timestamp and the geographic location;
storing, via the server, the plurality of parameters in a database communicatively coupled to the server; and filtering, via the server, the plurality of parameters for a plurality of relevant sporting surfing conditions based on the geographic location.

7. The method of claim 5, comprising:
predicting, via the server, a plurality of relevant surfing conditions; and generating the alert for an optimal condition associated with the surfing activity based on the plurality of relevant surfing conditions.

8. The method of claim 7, where predicting the plurality of relevant surfing conditions comprises:
identifying a first plurality of feature values associated with a geographic location;
determining whether the plurality of relevant sporting conditions match a set of user-preferences stored in a database;
storing training data that comprises a plurality of training instances, wherein each training instance in the plurality of training instances corresponds to the plurality of relevant wave conditions, and the training data includes the plurality of feature values; and
utilizing one or more machine learning techniques to train a classification model based on the training data; wherein the determination comprises inserting the plurality of feature values into the classification model that generates an output that is used to determine a time period for optimal surfing conditions.

9. The method of claim 5, wherein analyzing the plurality of relevant surfing conditions comprises receiving a selection of the media input and the user input.

10. The method of claim 5, wherein the user input is sourced from a social networking platform and configured to be stored in a database.

11. The method of claim 5, wherein the surfing condition information comprises at least one of a percent match, tide, a temperature, a wave height, a wave direction, a wave period, a sea level, a swell height, a swell direction, a swell period, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, ultraviolet ray filtration, and a visibility.

12. The method of claim 5, further comprising:
receiving at least one of the media input and a desired parameter from a user device;
receiving a forecast condition information from a database communicatively coupled to the hardware processor and determining that the forecast condition information is within a range of the alert; and
transmitting the alert in response to a determination that the forecast condition information is within the range of the alert.

13. A system for evaluating and forecasting a surfing condition comprising:

a non-transitory memory configured to store an executable code; and
a hardware processor configured to execute the executable code to:
identify a selection of a user of the media input related to a surfing activity using software running on the user device;
identify an interaction of the user with the media input that indicates an interest in the surfing activity presented in the media input;
receive at least one of the media input and a desired parameter associated with the surfing activity from the user device, wherein the media input includes a media metadata;
determine, based on the media metadata a timestamp and a geographical location associated with the media input;
retrieve a meteorological data based on the timestamp and the geographical location of the media input from a third-party meteorological database, wherein the meteorological data includes at least one of a wave height, a wave direction, a wave period, a sea level, a swell height, a swell direction, a swell period;
create an alert related to the surfing activity and based on at least one of the retrieved meteorological data of the media input and the desired parameter;
receive a forecast condition information from a database communicatively coupled to the hardware processor and determine that the forecast condition information is within a range of the alert; and
transmit the alert related to the surfing activity in response to a determination that the forecast condition information is within the range of the alert.

14. The system of claim 13, wherein the meteorological data and the desired parameter each include at least one of a temperature, a percent match, a tide, a secondary swell height, a secondary swell direction, a secondary swell period, a wind direction, a wind speed, a water temperature, an air temperature, a wind wave height, a wind wave direction, a wind wave period, an air pressure, a humidity, a precipitation level, a ultraviolet ray filtration, a current information, an underwater visibility, a visibility, a level of snow, a level of fresh snow, a base depth, a snow depth, and a packed powder data.

15. The system of claim 13, wherein the hardware processor is further configured to generate an alert associated with an optimal time period for the surfing activity based on the desired parameter.

16. The system of claim 15, wherein the alert is generated based on matching the desired parameter to a set of user preferred conditions associated with the surfing activity stored in the database.

* * * * *